United States Patent
VanBree et al.

(10) Patent No.: US 8,294,814 B2
(45) Date of Patent: Oct. 23, 2012

(54) SYSTEM FOR ACCURATELY REPOSITIONING IMAGING DEVICES

(75) Inventors: Ken VanBree, Mountain View, CA (US); Leila Sink, Los Gatos, CA (US)

(73) Assignee: Ken VanBree, Mountain View, CA (US)

( * ) Notice: Subject to any disclaimer, the term of this patent is extended or adjusted under 35 U.S.C. 154(b) by 0 days.

(21) Appl. No.: 12/658,385

(22) Filed: Feb. 8, 2010

(65) Prior Publication Data
US 2010/0149316 A1    Jun. 17, 2010

Related U.S. Application Data

(63) Continuation-in-part of application No. 10/811,019, filed on Mar. 26, 2004, now Pat. No. 7,688,381.

(60) Provisional application No. 60/461,952, filed on Apr. 8, 2003.

(51) Int. Cl.
*H04N 5/225* (2006.01)
*G06K 9/36* (2006.01)

(52) U.S. Cl. .............. 348/373; 348/207.11; 382/287
(58) Field of Classification Search .......... 348/135, 348/136, 137, 140, 141, 142
See application file for complete search history.

(56) References Cited

U.S. PATENT DOCUMENTS

| | | | | |
|---|---|---|---|---|
| 6,049,582 A * | 4/2000 | Navab | | 378/4 |
| 6,806,905 B1 * | 10/2004 | Morimoto et al. | | 348/333.02 |
| 6,816,184 B1 * | 11/2004 | Brill et al. | | 348/143 |
| 7,423,658 B1 * | 9/2008 | Uomori et al. | | 345/660 |
| 2007/0024704 A1 * | 2/2007 | Lin et al. | | 348/135 |
| 2008/0309772 A1 * | 12/2008 | Ikeda | | 348/208.7 |

* cited by examiner

*Primary Examiner* — Albert Cutler (57) ABSTRACT

The invention teaches a method of automatically creating a 3D model of a scene of interest from an acquired image, and the use of such a 3D model for enabling user to determine real world distances from a displayed image of the scene of interest.

3 Claims, 9 Drawing Sheets

SYSTEM FOR ACCURATELY REPOSITIONING IMAGING DEVICES

RELATED PATENTS AND APPLICATIONS

This application is a continuation in part of co-pending U.S. application Ser. No. 10/811,019 filed Mar. 26, 2004 now U.S. Pat. No. 7,688,381; priority is claimed from this and predecessor applications thereto, including provisional application 60/461,952 filed Apr. 8, 2003, each of which is incorporated by reference as if fully set forth herein.

GOVERNMENT FUNDING

Not Applicable.

FIELD OF USE

The invention taught herein related to the field of image processing, and more specifically to calibration and scaling of captured images to real world scenes.

BACKGROUND

Time-lapse images are used in a variety of applications including determining seed-lot growth rates, analyzing mechanical wear or corrosion, generating calibration signatures for oil exploration, and generating special effects for the advertising, media and motion picture industries.

High-quality time-lapse image sequence generation requires accurate repositioning of an imaging device relative to the subject of interest. Most current techniques for repositioning imaging devices require complex and expensive hardware.

Mathematical formulae for extracting the pose (camera center and orientation relative to the scene of interest) of an imaging device are known. *Multiple View Geometry In Computer Vision* by Richard Hartley and Andrew Zisserman, Cambridge University Press 2000 presents a full treatment of the required math. Similar mathematical techniques are used for blending images into panoramas or steadying an image subject to camera jitter.

Industries such as construction and re-modeling are increasingly relying on photographic documentation of different stages of construction. Typical use of photo documentation is to safely cut into finished wall when opening up finished surfaces at some later date. The cutting may be occasioned by any of a number of fact patterns, including responding to change orders, repairs, maintenance, re-modeling or re-purposing of rooms, wings, or building.

As large institutional construction projects increasingly use teams of contractors and subcontractors over long periods of time, ongoing challenges exist not only with respect to documentation of construction stage, but also meaningful communication between parties in many locations regarding the project. The use of captured images transmitted over, for example, the Internet or World Wide Web, provide wide flung team members visual documentation. However, in addition to viewing construction site images, a need exists for images to meaningfully augment or replace a site visit. More specifically, the two dimensional representation of the three dimensional space, ideally, would permit accurate measurement and analysis.

Currently some methods exist for preparing a captured image so as to enable such measurement capability. At least one commercially available product, Photomodeler, extracts information from a scene by projecting a uniform screen of dots. Such an approach is impractical for large construction projects. What is needed is an accurate and automatic means to provide Users with an image of a scene of interest (i.e. a room, wall, etc.) where accurate dimensions may be obtained from the image, rather than from a site visit or manual measurement of the construction site or building. As greater numbers of construction, engineering and design professionals are collaborating worldwide, such a tool would greatly facilitate planning, cost containment, and productive collaboration. Applicant has taught an innovative method and system for accurately re-positioning image capture devices (U.S. application Ser. No. 10/811,019, System for Accurately Repositioning Imaging Devices). What is needed is an improved means to obtain a set of transformations from a two dimensional image of a scene of interest to the actual three-dimensional scene of interest. Moreover, a challenge that still exists is how to automatically generate for the user viewing displayed captured images a means to calculate accurate scale of the real world scene using the photograph or other captured image.

BRIEF SUMMARY OF THE INVENTION

The invention taught herein meets at least all of the aforementioned unmet needs.

The invention provides to the user viewing displayed captured images obtained by the system described in Ser. No. 10/811,019 an improvement, i.e. a method and system for automatically generating the calculation and communication to user of accurate scale in the real world. In a preferred embodiment of the invention taught herein a measurement capability is added to the photographs (i.e. displayed captured images) using the 3D model of fixed points in a reference image as described in co-pending U.S. application Ser. No. 10/811,019.

In an alternate embodiment, computer recognizable targets are attached to fixed points in an area of interest in the scene of interest (i.e. in the real world at the time of image capture) such that a 3D model of those fixed points can be computed by analyzing the acquired, captured image, i.e. the photograph.

The method according to the invention taught here automatically generates, from an acquired image, a set of points comprising a three dimensional representation of a scene of interest such that each point in said generated set of points corresponds to an actual point in said actual scene of interest, where said acquired image depicts an actual scene of interest and wherein said actual scene of interest contains at least one actual object of interest, said method comprising the steps of:

a. applying actual calibration markings to actual object of interest oriented with said actual scene of interest, said actual calibration markings oriented so as to include at least one actual horizontal and at least one actual vertical line such that said actual vertical line and said actual horizontal line intersect to form an actual plane;

b. acquiring image of said scene of interest, where said acquired image includes image of said actual object of interest and image of said actual applied calibration markings, comprising imaged vertical calibration markings and imaged horizontal calibration markings, inclusive;

c. selecting from said image of said scene of interest said imaged calibration markings along at least one vertical line;

d. determining coordinates of said imaged vertical calibration markings along at least one vertical line;

e. determining the best fit line passing through said imaged vertical calibration markings along at least one said vertical line;

f. determining, by means of said imaged vertical calibration markings, the scale of said image of said object of interest with respect to said actual object of interest;

g. selecting from said image of said scene of interest said imaged calibration markings along at least one horizontal line;

h. determining coordinates of said imaged horizontal calibration markings along at least one horizontal line;

i. determining the best fit line passing through said imaged horizontal calibration markings along at least one said horizontal line;

j. determining, by means of said imaged horizontal calibration markings, the scale of said image of said object of interest with respect to said actual object of interest;

k. determining, by means of data obtained from steps c through j, said coordinates and said scaling of said imaged calibration markings along at least one said vertical line and said imaged horizontal calibration markings along at least one said horizontal line, corresponding actual coordinates of said actual plane in said actual scene of interest;

l. repeating steps c through k for any additional actual planes represented in said acquired image corresponding to said one or more actual objects of interest in said actual scene of interest;

m. outputting results from steps b through l where said output results provide a generated set of points comprising a three dimensional representation of said scene of interest such that each point in said generated set of points corresponds to an actual point in said actual scene of interest, whereas such said output results enable, with respect to any user selected points within said acquired image of said scene of interest, the calculation and display of the actual distance between the actual points corresponding to said selected points within said acquired image.

The invention in a preferred embodiment provides a means for a user viewing an acquired image using a display device connected to a user interface (e.g. a computer monitor, or a smart phone, or eye glass display) to determine actual measurement of an actual plane of interest from an acquired image of a scene of interest, said acquired image of said scene of interest including an image of said plane of interest, said acquired image displayed to user on a display means, said display means equipped with a user interface, said method comprising the steps of:

selecting four points in said acquired image of said scene of interest, said four points forming a quadrilateral in the image of the scene of interest, and also corresponding to a rectangle in said actual scene of interest;

determining the distance between points of at least two adjacent sides of said formed quadrilateral in said plane of interest, where said determination is by means of using a generated set of points comprising a three dimensional representation of said scene of interest such that each point in said generated set of points corresponds to an actual point in said actual scene of interest;

selecting any two points on said acquired image and on said image of said plane of interest; and displaying the actual distance between said selected two points on said acquired image by means of scaling the geometry relative to said formed quadrilateral, thereby providing user a display of an accurate real world measurement of a scene of interest by means of interface with the display of an acquired image of said scene of interest.

In an alternate embodiment, the step of determining the distance between points of at least two sides of said formed quadrilateral in said plane of interest is performed by user input of measurement of actual points and the distance between said actual points in said actual rectangle in said actual scene of interest where said actual points correspond to points in the formed quadrilateral in said plane of interest in said acquired image.

In an alternate embodiment, a measurement of 2 (two) vertically calibrated lines is sufficient, in the case where the selected camera is of sufficient sophistication to provide horizontal calibration information.

It can be appreciated that the invention taught herein may be implemented by means of being integrated into such imaging devices as a camera-enabled mobile phone and the like.

As has already been mentioned, fewer calibration points are needed if the imaging device is itself calibrated. In the case where the imaging device contributes no calibration to the image, twelve points are necessary for accurate scaling of the image with the current geometric modeling in the preferred embodiment of the invention.

BRIEF DESCRIPTION OF THE DRAWINGS

The drawings are those set forth herein below:

FIG. 7 A-C, inclusive, illustrates an exemplar of the display associated with a method of measurement within a plane of interest in an acquired image according to the invention.

DETAILED DESCRIPTION OF THE PREFERRED EMBODIMENT

The invention taught herein may be found in part in co-pending application Ser. No. 10/811,019, entitled "System for Accurately Repositioning Imaging Devices", now U.S. Pat. No. 7,688,381 B1. The System of Accurately Repositioning an Imaging System provides a means for User to accurately re-position an image capture device. This is useful in, for example, taking images during the course of construction, so elements such as walls can be photographed at the framing, drywall, electrical installation, and other stages. The accurate re-positioning of the image capture device,—ex. a camera—supports the ability to display overlaid images to the user, so the later photos can be "peeled away" to display a through view so as to view earlier stages of the feature being viewed. The "through view" (Thru-View™) capability is further explained in U.S. patent application Ser. No. 11/021,655.

"Thru-View™" is a trademark of Imaging Perspective, LLC and used in conjunction with e-Builts™, also belonging to Imaging Perspective, LLC.

Figure 1:
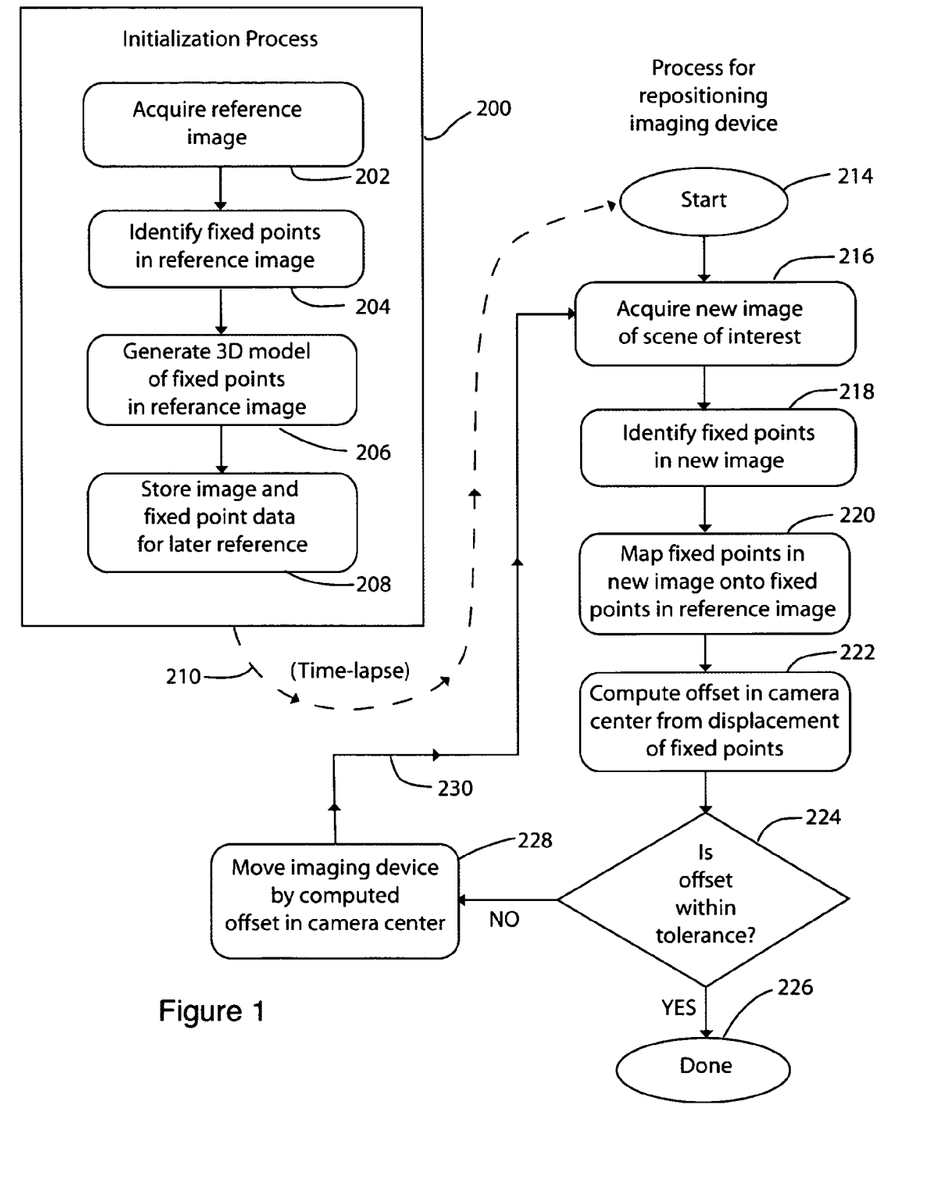
FIG. 1 is a generalized flowchart, originally FIG. 2 of Ser. No. 10/811,019

The present application provides an improvement to the system, method and apparatus for accurately repositioning imaging devices. Referring to FIG. 1, (which is FIG. 2 in previously co-pending application Ser. No. 10/811,019, now U.S. Pat. No. 7,688,381) Herein described are two embodiments, and both embodiments make use of the 3D model of fixed points in the reference image that are identified and recorded during the initialization process (steps 202, 204, 206 and 208 shown in FIG. 1 and repeated in FIG. 2.)

Figure 2:
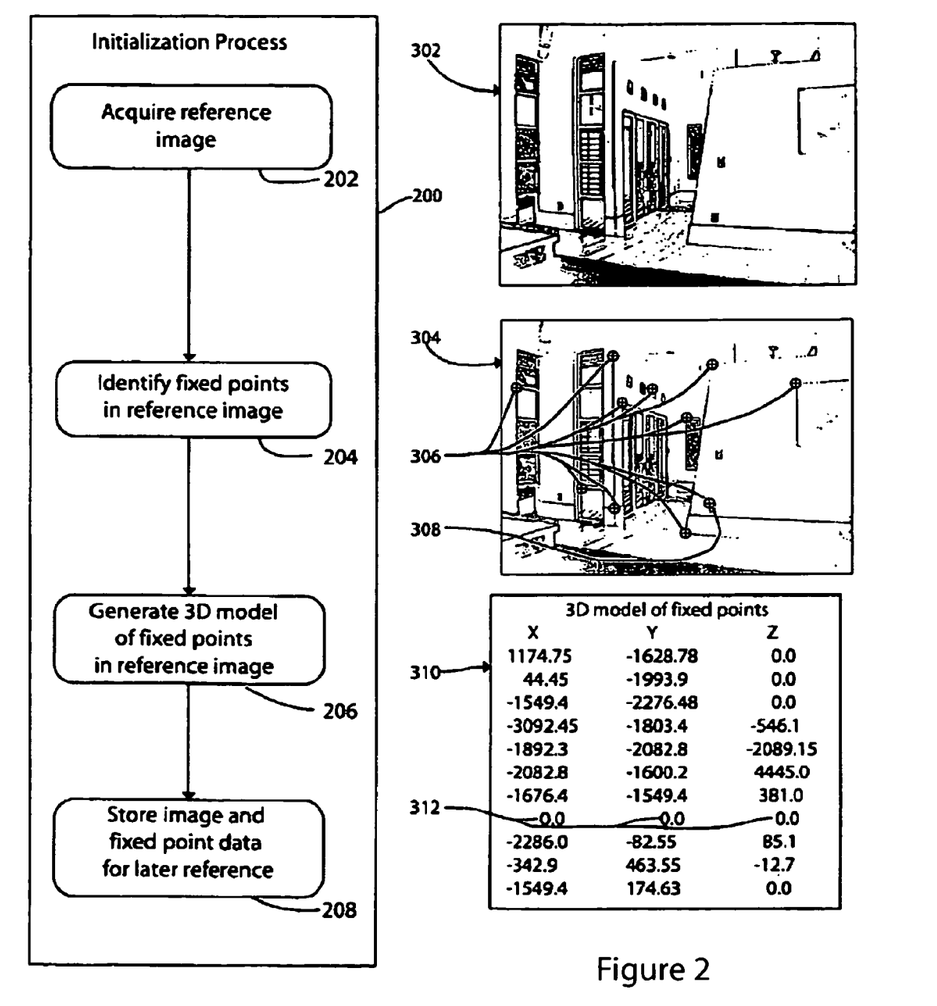
FIG. 2 depicts details of aspects of the invention, originally FIG. 3 of Ser. 10/811,019

Referring now to FIG. 2 (previously appearing as FIG. 3 in 10/811,019), an embodiment of the improvement to the system can be appreciated: FIG. 2 contains a generalized flowchart of the initialization process 200 along with the results of the proCess for identifying fixed points in the reference image (step 204 of said initialization process). The circumscribed crosses collectively identified as 306 indicate the locations of the fixed points in the reference image. An arbitrary fixed point, 308, was chosen as the origin of the real-world coordinate system for the 3D model of the fixed points. The 3D model of the fixed points consisting of X, Y, and Z coordinates is shown as table 310 on FIG. 2.

Another aspect of the improvement taught herein is an enhancement of the initialization process identified in FIG. 1. FIG. 1 is a flowchart for the various function modules comprising the system for accurately repositioning imaging devices (set forth in U.S. application Ser. No. 10/811,019). The initialization process 200 is used to prepare an image of a scene of interest for use as a reference image in the re-positioning process. The initialization process includes the steps 202, 204, 206 and 208. The first step of the initialization process is 202—acquire a reference image of the scene of interest. Step 204 is the identification of points in the reference that are likely to remain stable over the time frame of interest. Various algorithms exist to automatically extract features such as contours, edges and corners from an image. In step 206, a three dimensional (3D) model of the object represented by the fixed points is generated. This 3D model can be generated by direct measurement of points of interest in the scene of interest, or automatically generated and extracted from multiple views of the scene of interest taken from know camera/image acquisition centers. In step 208, the reference image the location of the fixed points, and the 3D model are stored for use later in the repositioning process.

The remaining modules are discussed in detail in paragraphs 18 and 19 of U.S. application Ser. No. 10/811,019, and are not reproduced here, as the improvement herein addresses the initialization step.

Figure 3:
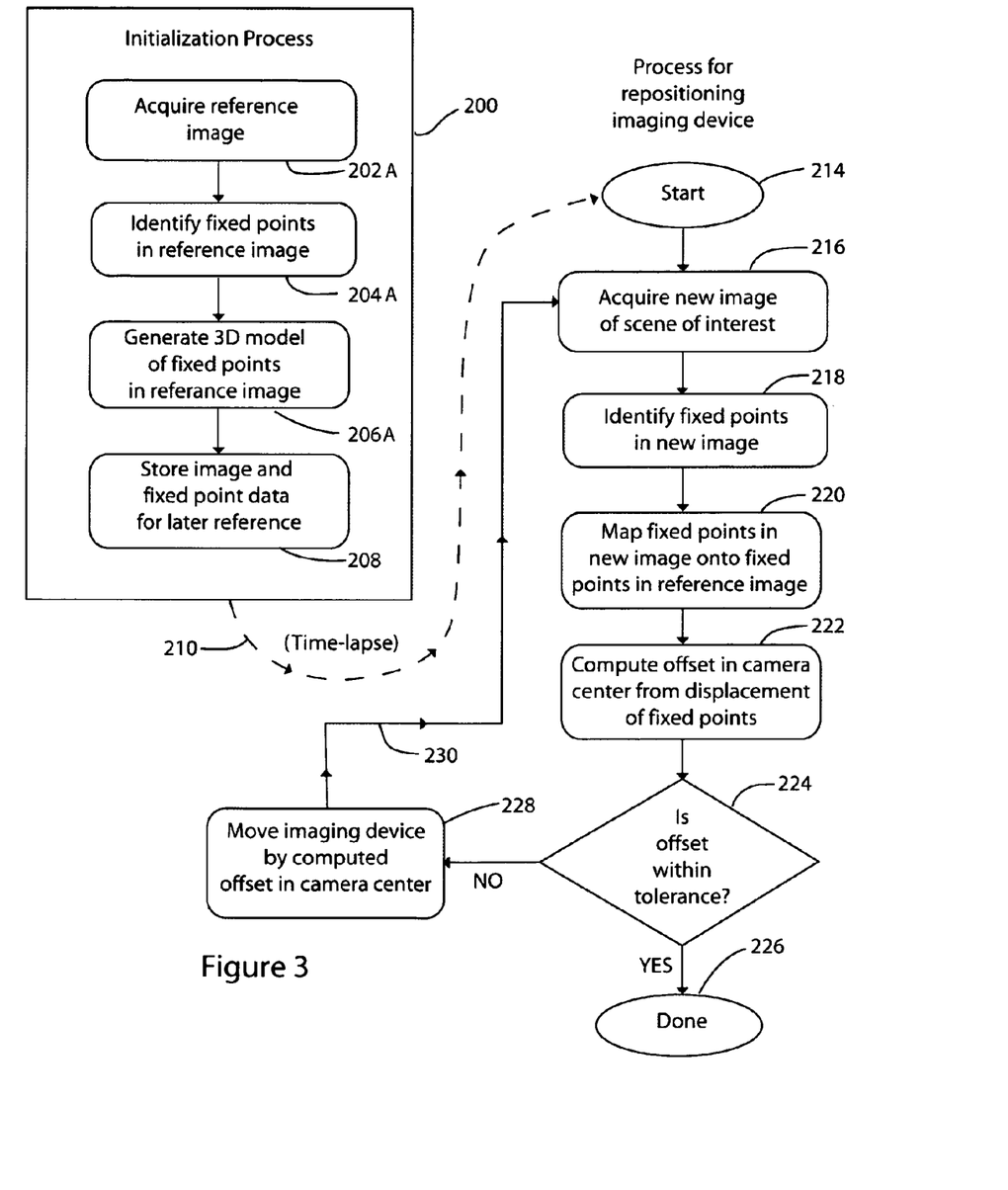
FIG. 3 illustrates steps in the invention set forth in application Ser. No. 10/811,019 that are referenced by the second embodiment of the invention taught herein.

To better convey an alternate, i.e. second embodiment of the improvement provided by the invention taught herein, and for convenience, the numbering of certain steps from FIG. 1 (specifically steps 202, 204 and 206) are similarly identified in the improved method, appearing in FIG. 3 as 202A, 204A, and 206A. Briefly, an initialization process 200 necessary for accurately re-positioning an image capture device, includes the steps of acquiring an image 202, identifying fixed points in the acquired image 204, and generating a 3D model of fixed points in the acquired image 206, which is stored for later use.

Figure 4:
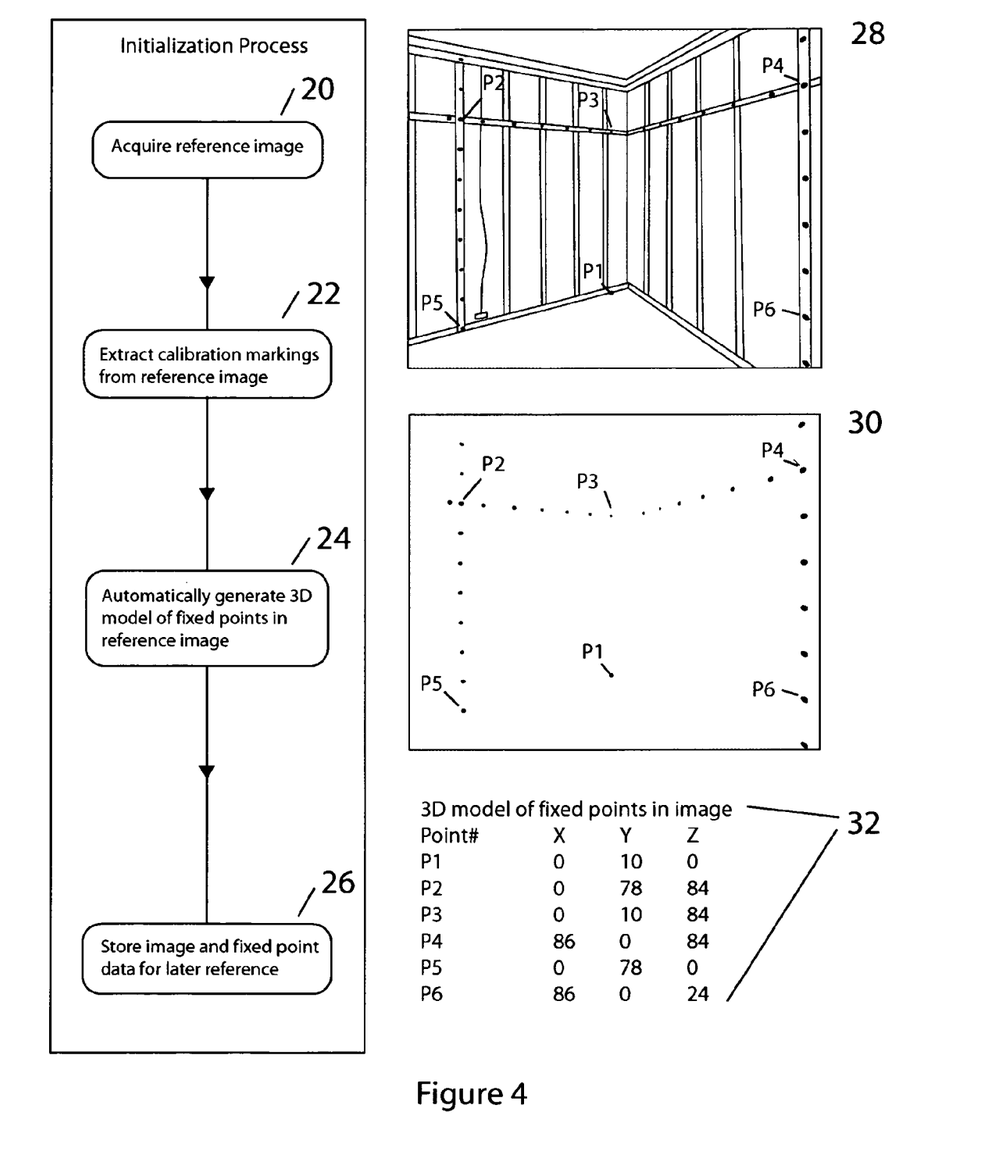
FIG. 4 illustrates the second embodiment, an improved method taught in FIG. 3, specifically an improved initialization process according to a preferred embodiment of the invention taught herein.

The improvement taught herein may be appreciated by referring to FIG. 4 and the detailed description set forth herein. The terms "acquired image" as used herein may be understood to be "reference image" for the purpose of harmonizing language as between this invention and that invention of which this is an improvement. The improved initialization process according to the invention comprises the steps of acquiring a reference image 20—an image of a scene of interest containing an object of interest; extracting calibration markings from acquired image 22; automatically generating a 3D model of calibration points in acquired image 24; and outputting (including storing) image and fixed point data for use in User analysis of scene of interest using displayed image through some User interface (ex. computer monitor and keyboard; smart phone, touchpad, etc.).

The calibration markings—periodic dark marks tracking vertical and horizontal elements in the scene of interest—are depicted in FIG. 4, 28. The vertical and horizontal markings appear on two walls meeting in a corner; no marks appear on the partial view of either the ceiling or floor (top and bottom of image, respectively). The markings in the image are not horizontal, owing to characteristics of image, perspective and distance. However, the calibration markings are vertical and horizontal in the actual scene of interest—i.e. the real world, physical, 3D environment that is the subject of interest, which the image is displaying in two dimensions. The identified fixed points in this exemplar are named P1, P2, P3, P4, P5, and P6.

In box 30 of FIG. 4, the step of extracting the fixed points—calibration markings—from the image 22 is visually depicted. The dark vertical and horizontal markings are preserved, and all other image aspects are absent (ceiling, floor, wall seams, etc.). In 30, the points named in 28 are presented with the same name, i.e. P1, P2, P3, P4, P5, and P6. The table of point values—32—represents the automatically generated 3D model of fixed points in the acquired image of the scene of interest.

Figure 5:
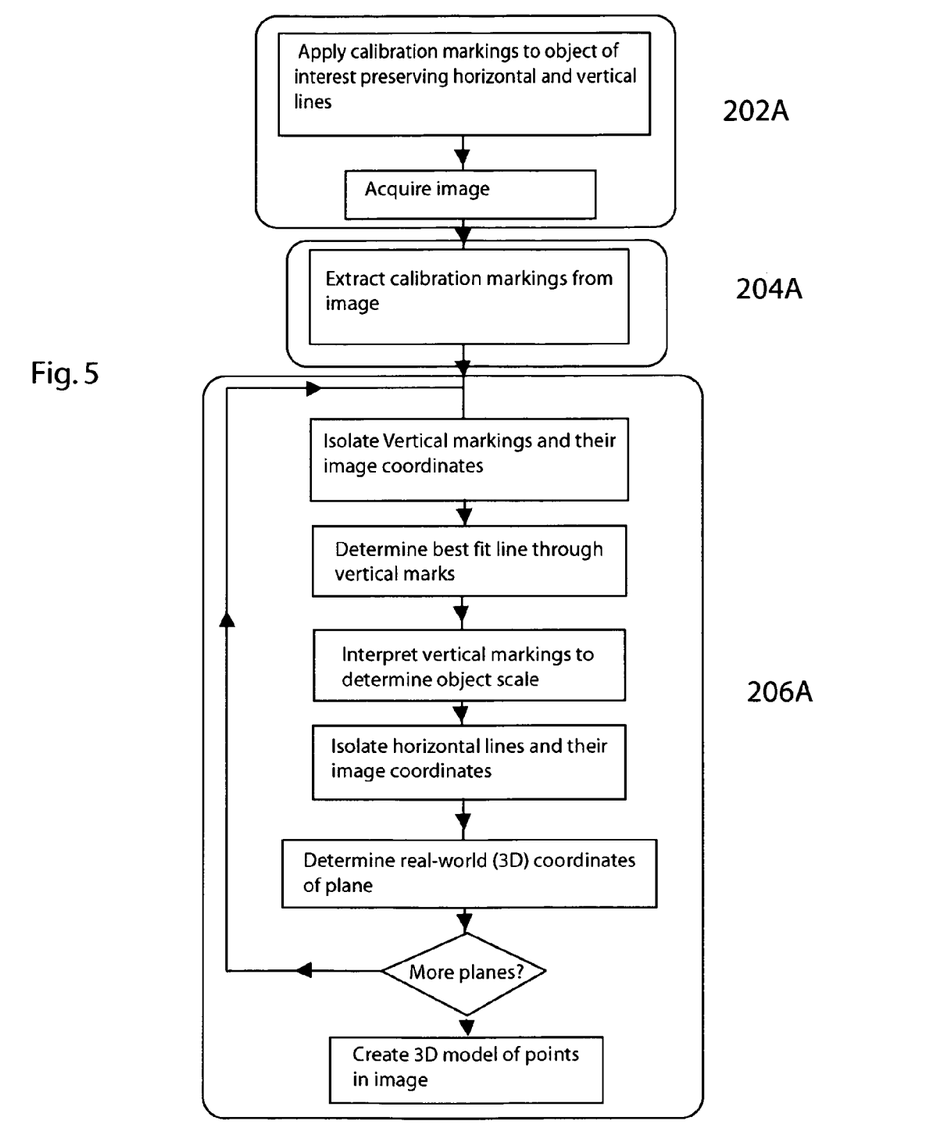
FIG. 5 illustrates the improved initialization process according to the invention.

Referring now to FIG. 5 the initialization process according to the invention is illustrated as a series of steps in greater detail than FIG. 4. In step 202A, calibration markings are applied to one or more objects of interest in the scene of interest. Calibration markings are applied so as to preserve vertical and horizontal lines in the scene of interest. As shown 28 of FIG. 4, vertical and horizontal markings were applied to the height and width of two walls meeting in a corner. Although one can conceive of many approaches to applying calibration markings, in the preferred embodiment, a pre-marked tape is applied. The marks on the tape are designed to photograph well, and to aid in the determination of scaling, of which more will be said later.

Once vertical and horizontal calibration markings have been applied 202A to an object of interest in a scene of interest, the next step is to acquire the image 204A of the scene of interest. The acquired image will include the object of interest, as well as the vertical and horizontal calibration markings applied in step 202A. After acquiring the image, extracting calibration markings from the image 204A is done (as shown in 30 FIG. 4).

Once the calibration markings have been extracted, the next step is automatically generating a set of points in the 2D image of the scene of interest that correspond to points in the 3D scene of interest (i.e. generating a 3D model) 206A, which step is comprised of the sub-steps of:

isolating vertical calibration markings and image coordinates of vertical calibration markings in the acquired image
   determine the best fit line through the vertical calibration marks
   interpret vertical calibration markings to determine object scale of image relative to actual scene of interest
   isolating horizontal lines and image coordinate of horizontal lines determining actual coordinates of actual plane, which actual plane is formed in the image by the vertical and horizontal lines signified by vertical and horizontal calibration markings, and repeating these sub-steps for as many planes of interest contained within the acquired image.

Referring to FIG. 4, 28 represents the intersection of two walls. The vertical and horizontal calibration markings signify two planes of interest: the wall on the left, and the wall on the right. In a case such as this, as there are two planes of interest, the sub-steps are performed twice. The horizontal calibration markings are automatically determined to comprise two lines, with points P2 and P3 on a first horizontal line, and point P4 on an image of a horizontal line intersection with line P2, P3. Best fit cannot alone be used on horizontal calibration markings when there are more than one plane of interest in a scene of interest, as more than one horizontal line will be extracted.

After the completion of the sub-steps comprising step 206A, the output is a set of points in the 2D image of the scene of interest that scalably correspond to actual points in the actual scene of interest. More specifically images of planes correspond to actual planes, as one or more planes are understood to be the object or objects of interest in the scene of interest. Such output may be stored in such a manner so a user connected to a display of an image of a scene of interest via a user interface may use the stored model as is further described below.

Figure 6:
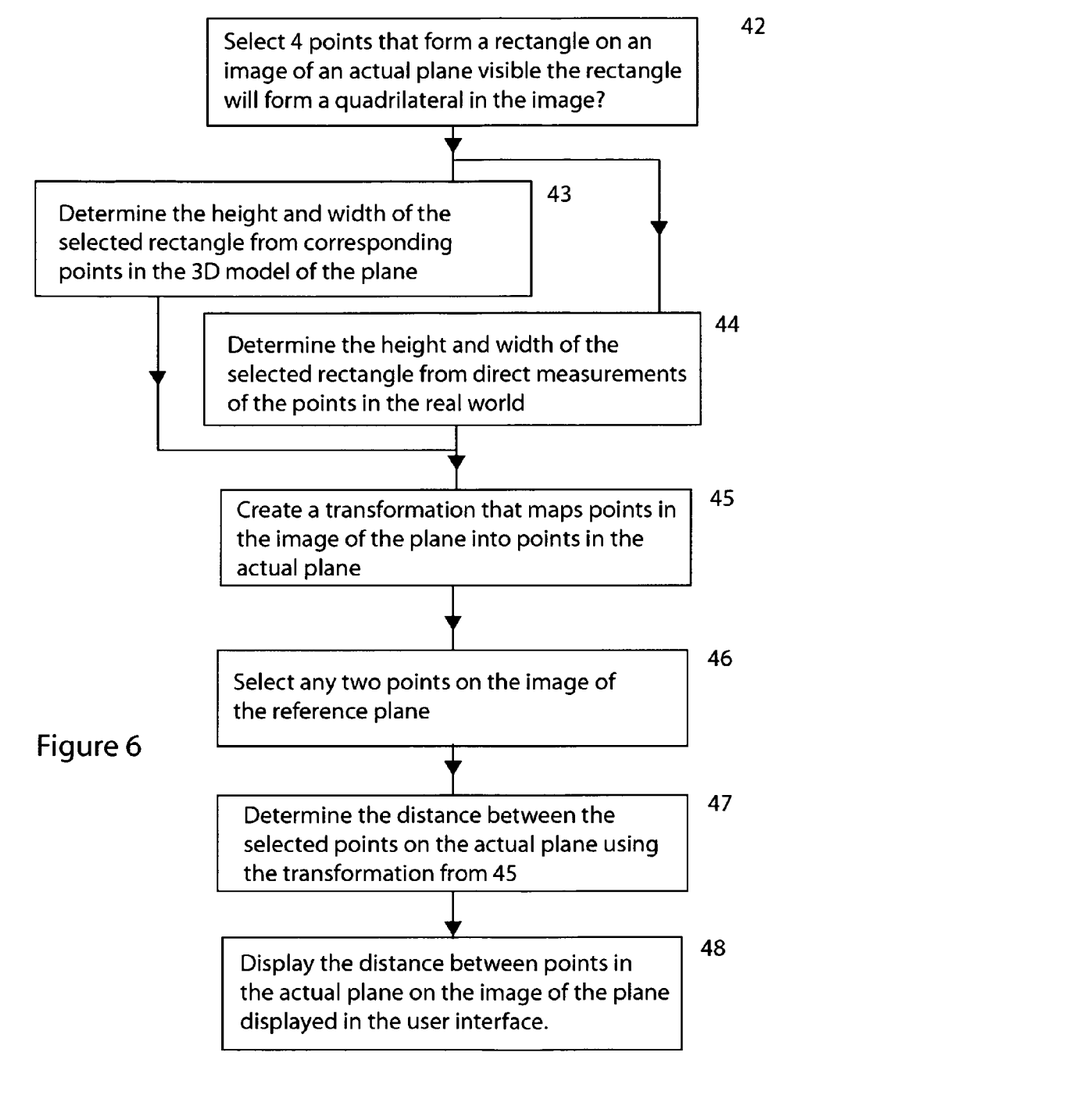
FIG. 6 represents the steps of a method of measuring real world distances from an acquired image according to an embodiment of the invention taught herein.

Referring to FIG. 6, a means whereby a User may cause to be displayed, or which, in some embodiments, may be automatically displayed, on a display of an image of a scene of interest, distances and dimensions of the actual, real world scene of interest. According to a preferred embodiment, the steps are:

select four points on the image that in the actual scene form a rectangle, but in the image will form a quadrilateral 42 determine the height and width of the actual rectangle from corresponding points in the 3D model of the actual plane 43 create a transformation that maps points in the image of the plane into points in the actual plane 45 select any two points on the image of the reference plane 46 determine the distance between the selected points on the actual plane using the transformation 47 display the distance between points in the actual plane on the image of the plane displayed in the user interface 48

Figure 7:
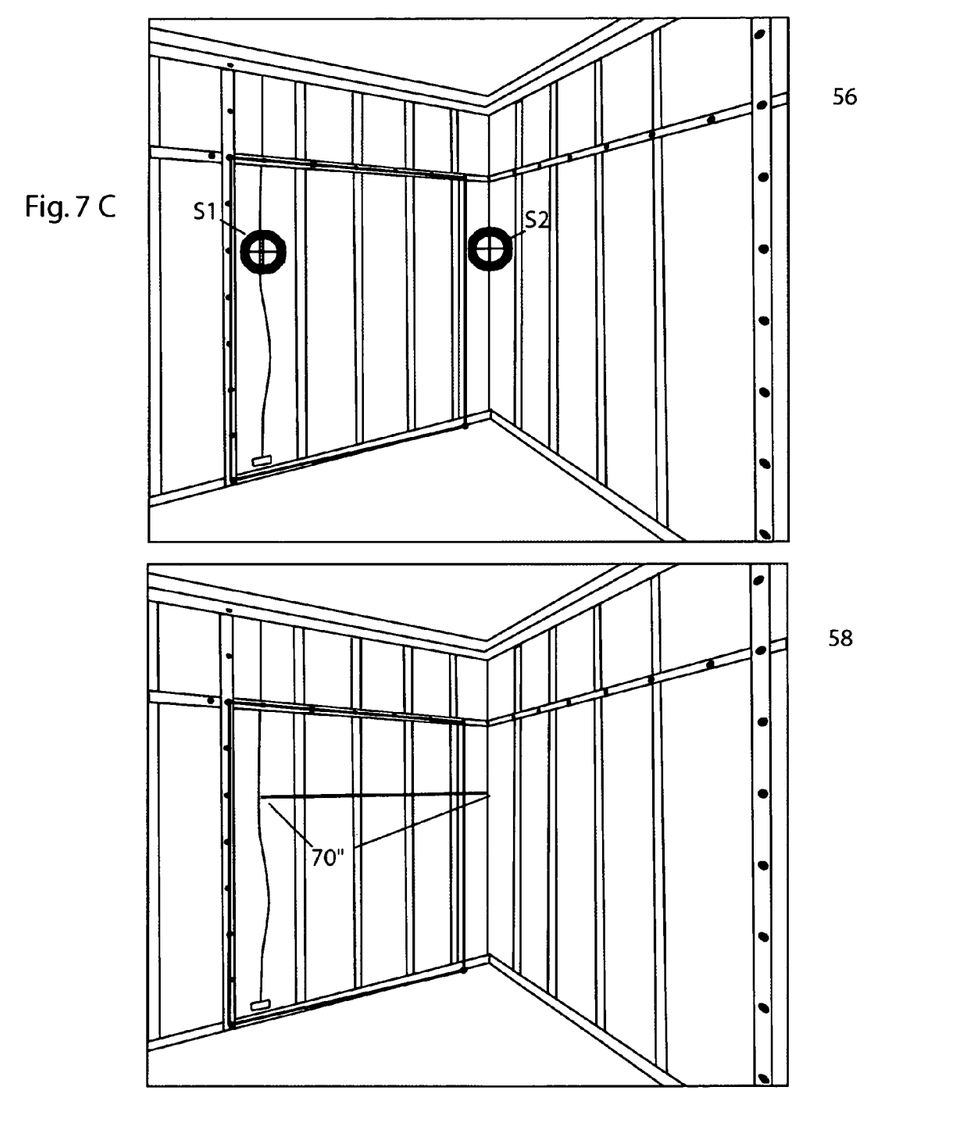
Figure 7A:
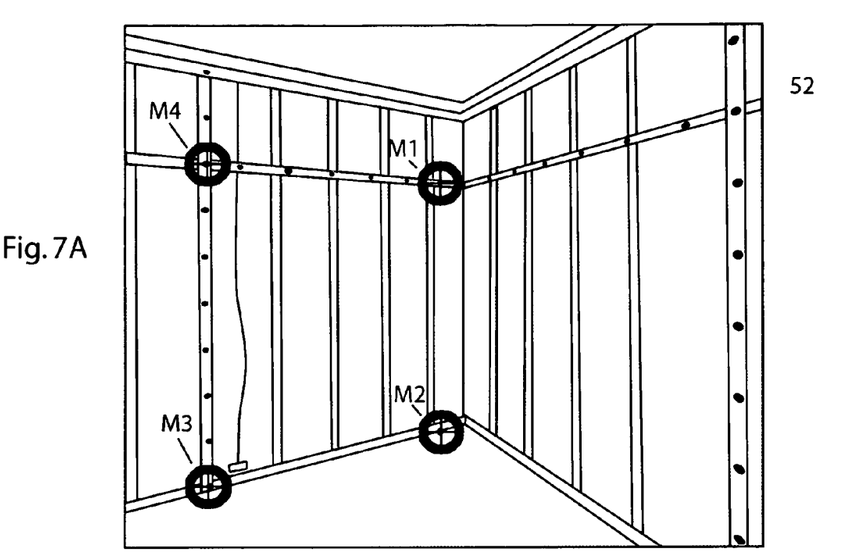

FIG. 7, A through C inclusive, illustrates an exemplar measurement according to the preferred embodiment of invention described in FIG. 6. Referring to FIG. 7A, which depicts an image of a scene of interest 52 which is easily recognized as left wall, a right wall, and an intersection of the left and right wall, with partial views of ceiling and floor. For the purposes of this example, the plane of interest is the left wall. The four selected points in the image are M1, M2, M3 and M4, and when connected with straight lines 53 form a four-sided quadrilateral in the image of the scene of interest.

Figure 7B:
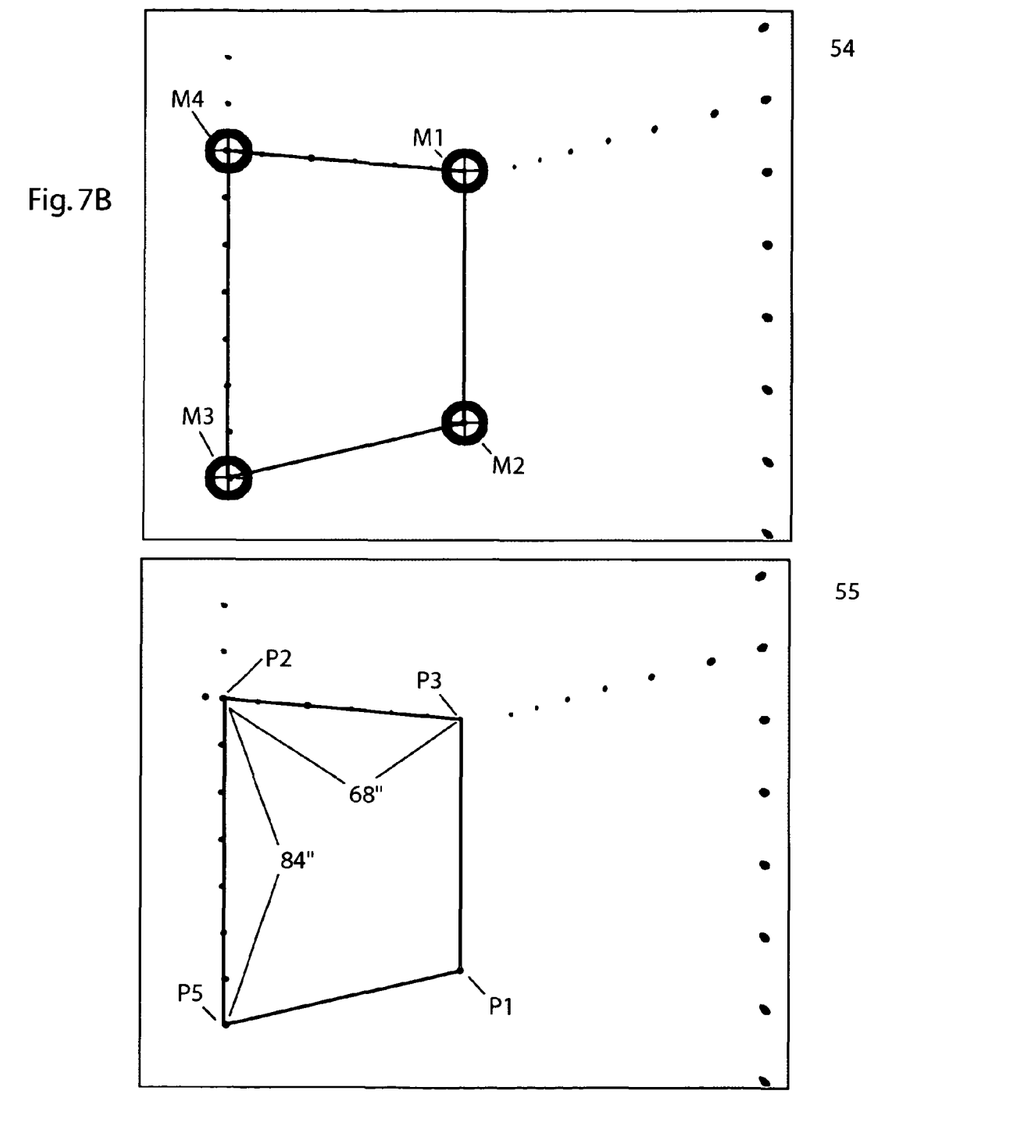

The step of identifying the height and width is represented by FIG. 7B 54, as selected points M1, M2, M3 and M4 are identified with associated stored points corresponding to points in the plane of interest (M1 corresponds to P3; M2 corresponds to P1; M3 corresponds to P5; M4 corresponds to P2). FIG. 7B, 55 illustrates the scaling of the horizontal and vertical sides of the quadrilateral with respect to the actual rectangle on the actual plane of interest i.e. the wall we're interested in measuring as in FIG. 7A 52. Once the scaling has created a transformation that maps points in the image of the plane into points in the actual plane (FIG. 6, 45) the User may select two points in the plane, shown as S1 and S2 in FIG. 7C 56. In an embodiment according to the inventions, the distance between the selected points on the actual plane is calculated using the transformation, and displayed to User on the image of the plane, 70 inches, as shown in panel 58 of Figure FIG. 7C.

It can be appreciated that so long as any four points in an image of an actual plane can be identified that correspond to points in the actual plane of interest, and no three points are co-linear, then the perspective distortion can be removed. For a more extensive explanation of this principle, refer to Hartley & Zisserman, as already cited, hereinabove. Thus, the User has a mapping between the image and the actual scene, and measurement in the image can be translated into measurements of the actual scene.

In an alternate embodiment, if a 3D model has not been created, then the actual distance can be directly determined and entered, FIG. 6, 44.

Uses and applications not specifically set forth here will naturally occur and the drawings, specification and claims are intended to encompass such embodiments of the invention. Forward looking mobile tools equipped with the invention may include such mobile devices as a phone equipped with a camera, or even an eye glass display type mobile device, where, upon snapping an image of a scene of interest, and using key or touch pad features on the phone or inputting to a eye glass display, the User will have an image useful in representing real world distances of the scene the User just photographed. One can envision a virtual or actual heads up display, where the User sees an overlay of dimensions on the actual or imaged scene. Moreover, such a photo and 3D model are rapidly and easily communicable to other interested parties at any location.

Embodiments of the invention of these sorts enable collaboration of many varieties of professionals, for example: engineering, planning, safety, construction and design personnel. Uses of the invention are virtually unlimited, including applications such as measuring for drapes, furnishings, fixtures or carpeting; supporting real estate, insurance or regulatory reports or transactions; or costing any sort of material or time and material estimate. As is the case with inventions of this sort, educational and training applications also exist, along with entertainment and media uses.

We claim:

1. An improved method for repositioning an image capture device relative to a subject of interest according to six degrees of freedom comprising the steps of determining actual measurement on an actual plane of interest from an acquired image of a scene of interest, said acquired image of said scene of interest including an image of said plane of interest, said acquired image displayed to user on a display means, said display means equipped with a user interface, said method comprising the steps of: a) initializing an imaging system, where said imaging system includes an image capture device, an automatic repositioning apparatus which also serves to provide a mount for said image capture device, and which, in turn, is mounted on a stable platform, and said automatic repositioning apparatus is connected to a computational device which includes a user interface, wherein initializing includes the steps of: a.1) obtaining a reference image of the subject of interest, wherein said reference image is acquired of a random or arbitrary scene of interest, identifying fixed points in said reference image, and wherein said reference image comprises a computational model/3 dimensional model generated from an initial image of said scene of interest, wherein said reference image includes multiple reference points in 3-dimensional space; a.2) repositioning the image capture device relative to the subject of interest, where such repositioning uses six degrees of freedom; b) imaging the subject of interest; c) computing the difference between the reference image of the subject of interest and the image capture device image, said computational device capable of receiving the reference image image capture such that when said imaging device captures a new image of the scene of interest, which image is input to the computational device, as is the reference image of scene of interest, such that said computational device determines the difference in position of the image capture device, transmits position difference information to the automatic repositioning apparatus and indicates via the user interface amount and direction of movement to accurately reposition the image capture device relative to scene of interest; d) refining the position of the image capture device by the automatic repositioning apparatus and where the required displacement is outside the range of motion of the automatic repositioning apparatus, then the user interface instructs the operator to move the stable platform the required distance in the required directions, so that the image capture device is in the same position relative to the subject of interest as that position from which the reference image was obtained, where such refining the position of the image capture device occurs along six degrees of freedom, wherein said improvement comprises the steps of:

selecting at least four co-planar but non-collinear points from said 3D model, along with pixel positions, within the acquired image, such that a 2D projective transformation can be generated;

using said 2D projective transformation to map x,y pixel positions in the plane of the acquired image onto X,Y real world measurements on the plane in the real world plane of interest, such that any other known co-planar point can be calculated and communicated.

2. An improved imaging system to reposition an image capture device in a position relative to a subject of interest according to six degrees of freedom as preserved in association with a reference image of the subject of interest, comprising:

an image capture device;

an automatic repositioning apparatus on which the image capture device is mounted, which, in turn, is mounted on a stable platform, said automatic repositioning apparatus operable to orient the image capture device relative to a subject of interest according to six degrees of freedom;

an acquired reference image of the subject of interest, wherein said acquired reference image is acquired of a random or arbitrary scene of interest, identifying fixed points in said reference image, and wherein said reference image comprises a computational model generated from an initial image of said subject of interest;

a computational device coupled to the automatic repositioning apparatus, including a user interface, such computational device capable of receiving images from the image capture device and receiving the reference image, performing a comparison, and communicating adjustments to reposition the image capture device along any of six degrees of freedom, wherein said image capture device captures a new image of the scene of interest, which new image is input to the computational device through a bi-directional path, and said reference image is input to the computational device through said path, whereupon said computational device determines the difference in position of the imaging device, and transmits this information to said automatic repositioning apparatus through said bi-directional path and said user interface indicates the amount and direction of movement required to accurately reposition the imaging device relative to the scene of interest and where the automatic repositioning apparatus accurately repositions the imaging device if the required displacement is within the range of motion of the apparatus, and if the required displacement is outside the range of motion of the automatic repositioning apparatus, then the user interface instructs the operator to move the stable platform the required distance in the required directions, said improvement comprising:

means to provide user a display of an accurate real world measurement of a scene of interest by means of interface with the display of an acquired image of said scene of interest.

3. An improved apparatus for positioning an imaging device and coupling to an image capture device and where such automatic repositioning apparatus positions said image capture device along six degrees of freedom, such that the positioning of the image capture device is controllable and said apparatus orients the image capture device relative to a subject of interest using six degrees of freedom to orient the image capture device, and wherein said positioning of said image capture device relies on a reference image of the subject of interest, wherein said reference image is based on an initial acquired image of a random or arbitrary scene of interest, where said initial acquired image enables the identification of fixed points in said reference image, and wherein said reference image comprises a computational model generated from said initial acquired image of said subject of interest; and where said automatic repositioning apparatus, coupled to said image capture device, is mounted on a stable platform, and said automatic repositioning apparatus is connected to a computational device, said computational device capable of receiving the reference image, such that when said image capture device captures a new image of the scene of interest, which image is input to the computational device, as is the reference image of scene of interest, whereupon said computational device determines the difference in position of the image capture device, and transmits position difference information to the automatic repositioning apparatus, and, the user interface indicates amount and direction of movement to accurately reposition the image capture device relative to the scene of interest, and the user interface instructs the operator to move the stable platform the required distance in the required directions where the required displacement is outside the range of motion of the automatic repositioning apparatus, said improvement comprising:

means to provide user a display of an accurate real world measurement of a scene of interest by means of interface with the display of an acquired image of said scene of interest.

* * * * *